(12) United States Patent
Martensson et al.

(10) Patent No.: US 7,967,455 B2
(45) Date of Patent: Jun. 28, 2011

(54) METHOD FOR THE CONTROL OF A REARVIEW MIRROR AND REARVIEW-MIRROR SYSTEM FOR IMPLEMENTING THE METHOD

(75) Inventors: Bengt Martensson, Munich (DE); Klaus Lange, Rottendorf (DE); Stefan Hiemer, Furth Im Wald (DE); Klaus Hoegerl, Furth Im Wald (DE); Matthias Schiller, Willmering (DE)

(73) Assignee: Flabeg GmbH & Co. KG, Fuerth (DE)

( * ) Notice: Subject to any disclaimer, the term of this patent is extended or adjusted under 35 U.S.C. 154(b) by 159 days.

(21) Appl. No.: 11/537,042

(22) Filed: Sep. 29, 2006

(65) Prior Publication Data

US 2007/0081251 A1    Apr. 12, 2007

(30) Foreign Application Priority Data

Sep. 29, 2005 (DE) .......................... 10 2005 046 850

(51) Int. Cl.
*G02B 5/08* (2006.01)
(52) U.S. Cl. .................... 359/604; 359/603; 359/843
(58) Field of Classification Search .................. 359/603, 359/604, 843
See application file for complete search history.

(56) References Cited

U.S. PATENT DOCUMENTS

| 4,572,619 A | 2/1986 | Reininger et al. |
| 4,793,690 A | 12/1988 | Gahan et al. |
| 4,917,477 A | 4/1990 | Bechtel et al. |
| 2002/0158805 A1* | 10/2002 | Turnbull et al. ............... 343/713 |
| 2002/0181112 A1* | 12/2002 | Bechtel et al. ................. 359/604 |

FOREIGN PATENT DOCUMENTS

| DE | 3041692 | 5/1981 |
| DE | 3722348 | 10/1988 |
| DE | 19622002 | 12/1997 |
| JP | 59-139016 A | 8/1984 |
| JP | 63-078843 A | 4/1988 |
| JP | 63-261231 A | 10/1988 |
| JP | 2003-260933 A | 9/2003 |
| JP | 2005-156676 A | 6/2005 |

* cited by examiner

*Primary Examiner* — Joshua L Pritchett
(74) *Attorney, Agent, or Firm* — Leydig, Voit & Mayer, Ltd.

(57) ABSTRACT

A method for controlling a rearview mirror, in particular for motor vehicles, provided with a reflection part with variable reflectance, includes supplying a control unit assigned to the reflection part with a nominal value for the reflectance. To provide a nominal value which is particularly favorable for the respective driving situation, the nominal value is specified by taking into consideration a first characteristic value characteristic of the sensitivity which adjusts in the viewer's eye due to the light situation, and/or a second characteristic value characteristic of the kind of ambient light.

24 Claims, 2 Drawing Sheets

METHOD FOR THE CONTROL OF A REARVIEW MIRROR AND REARVIEW-MIRROR SYSTEM FOR IMPLEMENTING THE METHOD

Priority is claimed to German Patent Application No. DE 10 2005 046 850.0, filed on Sep. 29, 2005, the entire disclosure of which is incorporated by reference herein.

The present invention relates to a method for the control of a rearview mirror, in particular for motor vehicles, provided with a reflection part with variable reflectance, in which a control unit assigned to the reflection part is supplied with a nominal value for the reflectance. It relates, furthermore, to a rearview-mirror system, in particular for motor vehicles, for implementing the method.

BACKGROUND

Typical known coatings for automobile mirrors usually consist of relatively highly reflecting metals, such as, for example, silver or aluminium. The reflection values achievable with them for automobile mirrors amount to more than 85% in the visible light spectrum. Although, however, relatively high reflection values are desirable in the daylight, they might glare the driver at night through the headlights of the following vehicles. Therefore, mirror coatings were developed which are designed to reduce the glaring effect when driving at night. For this purpose, one can use, on the one hand, mirror systems which have a relatively low glaring effect at night, due to suitably designed reflecting elements, using in particular spectrally selective reflection coatings. On the other hand, one can also use rearview mirrors in which the risk of glaring through the headlights of the following vehicles is reduced by the fact that the mirror structure contains parts of variable transmission which are switched, for example, electrically.

In rearview mirrors designed in such a way, a reflection part with variable reflectance is used, using, for example, electrochromic elements or LCD elements. These can be integrated in the layer structure of the mirror system, for example, in the manner of an intermediate layer, it being possible to vary the transmission of the respective optically active layer by supplying it with a suitable chosen control signal and to modify in this way the reflectance of the reflection part of the rearview mirror.

In such systems, usually a multitude of design targets have to be taken into account. On the one hand, it is desirable to keep the glaring of the driver through the headlights of the following vehicles as low as possible. For this purpose, the rearview mirror should be switched to relatively dark, i.e. to a relatively low reflectance, when driving at night. On the other hand, however, also and especially at night, it should be guaranteed that the environment, i.e., for example, the surroundings of the vehicle, is perceived as reliably as possible, for which purpose a relatively high reflectance of the mirror is required. In order to provide the optimum compromise between these design targets, control or check units can be used in rearview-mirror systems with a rearview mirror provided with a reflection part with variable reflectance, which supply the reflection part with a control value suitably chosen under certain conditions.

In order to suitably take into account the ambient-light and glaring conditions, such rearview mirrors are usually provided with at least two light sensors, the first one measuring the illuminance impinging on the rearview mirror from the forward direction, which is representative for the background or ambient light, and the second one measuring the illuminance impinging from the backward direction, which is characteristic of the glaring through the following vehicles. The measured values supplied by these sensors can be used for specifying a suitable nominal value for the reflectance of the rearview mirror, the effects of usually quickly changing lighting conditions on the one hand and the inertia of the human eye due to physiological reasons on the other hand being taken into account or compensated through suitable averaging of the obtained measured values and in particular through suitably chosen low-pass circuits and the like.

A rearview-mirror system of this type is known, for example, from U.S. Pat. No. 4,917,477, which is incorporated by reference herein. This system uses, in addition to suitably chosen low-pass filters, static performance characteristics, in order to provide through suitable linking of the determined illuminance of the ambient light and of the glaring light a particularly favorable nominal value for the reflectance of the rearview mirror.

SUMMARY OF THE INVENTION

It is an object of the present invention to provide a method of the above-mentioned type with which a nominal value for the reflectance of the rearview mirror can be provided which is particularly favorable for the respective driving situation, whereby a particularly high basic brightness of the mirror system for a reliable perception of the environment can be achieved, guaranteeing at the same time in particular a large extent of freedom of glare for the driver. Furthermore, a rearview-mirror system for a motor vehicle, which is suitably designed for applying the method, shall be provided.

The present invention provides a method for the control of a rearview mirror, in particular for motor vehicles, provided with a reflection part with variable reflectance, in which a control unit assigned to the reflection part is supplied with a nominal value for the reflectance, the nominal value being specified taking into consideration a first characteristic value, which is characteristic of the sensitivity which adjusts in the viewer's eye due to the light situation, and/or a second characteristic value, which is characteristic of the kind of ambient light.

For determining a suitable nominal value which is particularly adapted to the requirements, both the current glaring situation of the driver and the current ambient conditions should be evaluated, using the measured values which are available anyhow, namely the luminous intensity of the ambient light on the one hand and the luminous intensity of the glaring on the other hand. In order to take into consideration the glaring situation for the driver in a particularly effective way, the biological reaction of the eye and/or the eye physiology should be taken into account, if possible, in addition to the light conditions present at the viewer's eye. Regarding the evaluation of the light situation in the viewer's eye, this can be effected by also taking into account the sensitivity adjusting in the viewer's eye as a consequence of the lighting situation. Regarding the ambient or background light, this can still be taken into account by utilizing the knowledge that with varying ambient light conditions, the adaptation and, therefore, also the risk of glaring of the eye varies, so that in particular varying ambient light conditions may have different consequences for the perception of the glaring. To take this into account, the determined nominal value should also be chosen as a function of the kind of ambient light.

To determine the first characteristic value, preferably the light situation in the viewer's eye is determined, taking into account the ambient light and the glaring light reflected by the rearview mirror, preferably evaluating for this determination the sum of a first measured value which is characteristic of the luminous intensity of the ambient light and a second measured value which is characteristic of the luminous intensity of the glaring light, multiplied by the currently adjusted reflectance of the rearview mirror. Based on these measured values, preferably a first characteristic value, which is characteristic of the resulting sensitivity of the eye, is determined, whereby a possible glaring situation can be detected as a function of the current and previous light conditions and, thus, as a function of the state of the eye.

When determining such a sensitivity of the eye, which in addition to the obtained measured values also takes into consideration the reaction of the eye, which depends on biological or physiological factors—expressed in particular through the eye's characteristic reaction times—, the first characteristic value is preferably permanently cyclically determined anew. In the new calculation, the currently given first characteristic value is advantageously modified by a correction value which, for its part, is a function of the deviation of the sensitivity adjusting in the viewer's eye as a consequence of the current light situation from the currently given first characteristic value. By suitable weighting of the contributions utilized for this, one can in particular take into account a different dynamics of the change of the light conditions, on the one hand, and of the change of the state of the eye, on the other hand, by using corresponding suitably chosen time constants. The correction value is advantageously weighted with the quotient of the cycle time and a time constant, which, for its part, advantageously takes into account the typical reaction time of the viewer's eye in the current situation.

In a particularly advantageous way, the time constant which is characteristic of the reactions of the eye is chosen as a function of the sensitivity adjusting in the viewer's eye as a consequence of the current light situation. This takes into consideration the knowledge that the eye can react to changing lighting conditions with different speeds, depending on the respective lighting state. In particular, in the glaring state, a relatively fast change of the system properties is required to eliminate the glaring state of the eye as fast as possible. If, however, no glaring is given, one can distinguish for a particularly situation-adapted tracking of the respective characteristic values whether the eye is in the state of photopic vision or in the state of scotopic vision, as for these two states, different reaction times of the eye to changing lighting conditions are relevant. Therefore, by taking into consideration such suitably chosen time constants, it can be achieved that, within the framework of the cyclic new calculation, the first characteristic value can be adapted particularly well to the eye's reactivity and can be tracked in a way particularly well adapted to the necessity of a fast change, whereby, to avoid overshooting effects or the like, a requirement-oriented low-pass function can, nevertheless, be maintained.

The second characteristic value, however, shall take into consideration the knowledge that a nominal value identified as being particularly advantageous for the reflectance of the rearview mirror can also depend on the current driving situation and in particular of the current traffic complexity. For example, it can be necessary, when driving in an urban environment—with an otherwise altogether constant average lighting level—to adjust a particularly high brightness on the rearview mirror, possibly accepting a slight glaring effect, in order to enable the driver to perceive the environment to a particularly high extent. On the other hand, for example when driving in a rural environment, where perception-relevant impressions or the like are not to be expected with the same frequency, it may be desirable to rather accept an altogether lower brightness, i.e. a lower reflectance of the mirror and to guarantee in turn an optimum glaring protection. To be able to take into consideration to a particularly favorable extent these differences of traffic complexity and the resulting requirements imposed on a particularly favorably chosen nominal value, the second characteristic value is chosen in such way that it is characteristic of the kind of ambient light.

This is based on the knowledge that a differentiation between the various traffic situations—for example driving in urban areas on the one hand and driving in rural areas on the other hand—is possible by means of the kind of ambient light, namely in particular by means of the latter's dynamics. When driving in areas with a relatively high traffic complexity, for example in an urban environment, the ambient light conditions are likely to change frequently and quickly, for example due to streetlights or the like, whereas, when driving in a rather rural environment, the ambient light conditions are rather likely to be constant. In order to take this into consideration in a particularly appropriate way when determining the nominal value, a variance parameter for the luminous intensity of the ambient light is advantageously determined for the determination of the second characteristic value, said variance parameter characterizing the fluctuations, preferably as to time, of the luminous intensity of the ambient light—and thus of its dynamics—around a pre-determined mean value.

Advantageously, the variance parameter is permanently cyclically determined anew, the currently given variance parameter being modified in the new calculation by a correction value which, for its part, is a function of the deviation of the difference between the current luminous intensity of the ambient light and the mean value of the luminous intensity of the ambient light from the currently given variance parameter. When determining the correction value, negative contributions can be suppressed in order to take into consideration specific driving situations. The difference is preferably evaluated linearly or quadratically. This correction value, too, is advantageously weighted with a quotient of the cycle time and a suitably chosen time constant, so that the relevant reaction times can suitably be taken into consideration in the manner of a low-pass function.

Advantageously, a minimum and a maximum value are specified for the second characteristic value, so that the influence of the second characteristic value on the nominal-value determination is limited to a bandwidth which is considered as plausible.

Preferably, the nominal value is chosen proportionally to the first and second characteristic values. In another advantageous embodiment, a minimum and a maximum value are specified for the nominal value, too, said values being determined by the achievable minimum and maximum reflectances of the respective rearview mirror.

Regarding the rearview-mirror system, in particular for motor vehicles, the above-mentioned object is achieved with a rearview mirror provided with a reflection part with variable reflectance and with a control unit which is assigned to the reflection part and which can be supplied by a check unit with a nominal value for the reflectance, the check unit being designed for determining the nominal value according to the above-described method.

Advantages achieved with the invention include in particular the fact that the taking into account of the preferably cyclically determined first characteristic value which is characteristic of the sensitivity of the viewer's eye and/or of the preferably also cyclically determined second characteristic value which is characteristic of the kind of ambient light when determining the nominal value for the reflectance of the rearview mirror enables an activation of the rearview mirror in a way particularly well adapted to the situation and to the requirements, it being possible to take into consideration in particular the actual requirement situation in the viewer's eye which is given for physiological reasons. The first characteristic value can be determined within the framework of the control system for the rearview mirror in the manner of a so-called "eye module", whereas the second characteristic value can be determined within the framework of the so-called "traffic complexity module". In particular by choosing suitable time constants in these modules, the inherent reaction times of the eye can be taken into consideration to a particularly favorable extent, with cyclic processing, through suitably chosen relations between the cycle time and the respective time constant.

BRIEF DESCRIPTION OF THE DRAWINGS

One embodiment of the invention is explained in detail with reference toe the drawings, in which.

DETAILED DESCRIPTION

Identical parts are identified in the two figures with reference numbers and characters.

Figure 1:
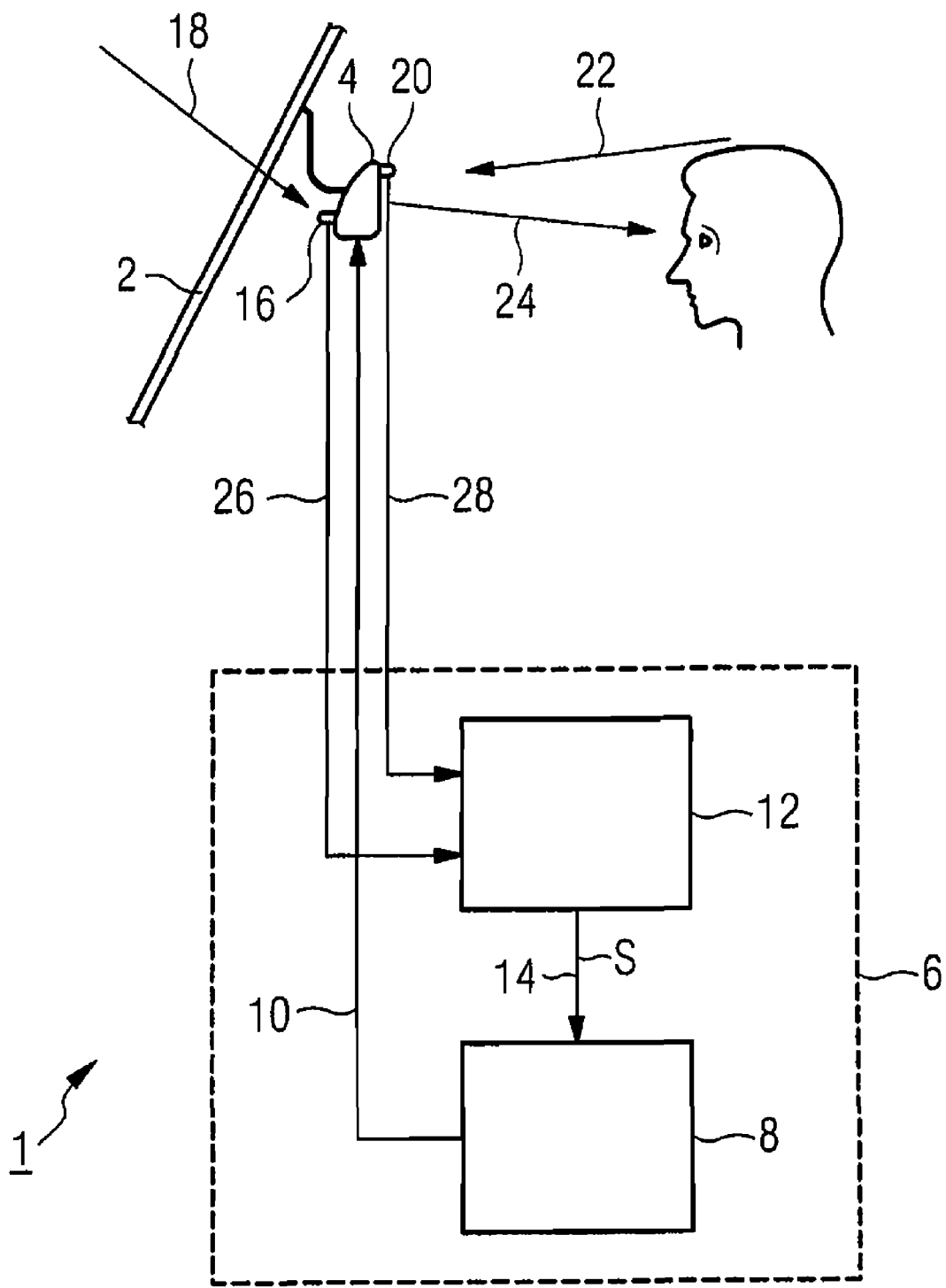
FIG. 1 shows a schematic view of a rearview-mirror system for a motor vehicle.

The rearview-mirror system 1 according to FIG. 1 is designed for use in a motor vehicle of which FIG. 1 only shows the windshield 2. A rearview mirror 4 is fixed on the windshield 2 in a conventional way as an inside mirror, the rearview mirror 4 being designed in a way which is not illustrated in detail as a rearview mirror with variable reflectance. For this purpose, the rearview mirror 4 in the embodiment example is designed as an electrochromic mirror, other suitable designs, for example as an LCD mirror, being, however, also possible. The rearview mirror 4 comprises in a way which is not illustrated in detail a reflection part with variable reflectance.

For adjusting a desired reflectance, the rearview-mirror system 1 comprises, in a control system 6, a control unit 8 assigned to the reflection part, which, as indicated by the arrow 10, emits an activation signal, for example a control voltage, to the rearview mirror 4. As a function of this control signal, the reflection part of the rearview mirror 4 changes its reflectance in the usual way.

The control unit 8 specifies the control signal as a function of a multitude of imaginable parameters. In particular, it takes into consideration a nominal value S provided by the assigned check unit 12, as indicated by the arrow 14. The control unit 8 is designed for outputting, based on the transmitted nominal value S, a suitable control signal, in particular a suitable activation voltage, to the rearview mirror 4 in such a way that the latter's reflectance approximates to the nominal value S in the best possible way. In particular, measured actual values and other supplied parameters can also be taken into consideration, it being possible in particular to also connect an automatic control at the outlet side, taking into consideration the nominal value S.

Figure 2:
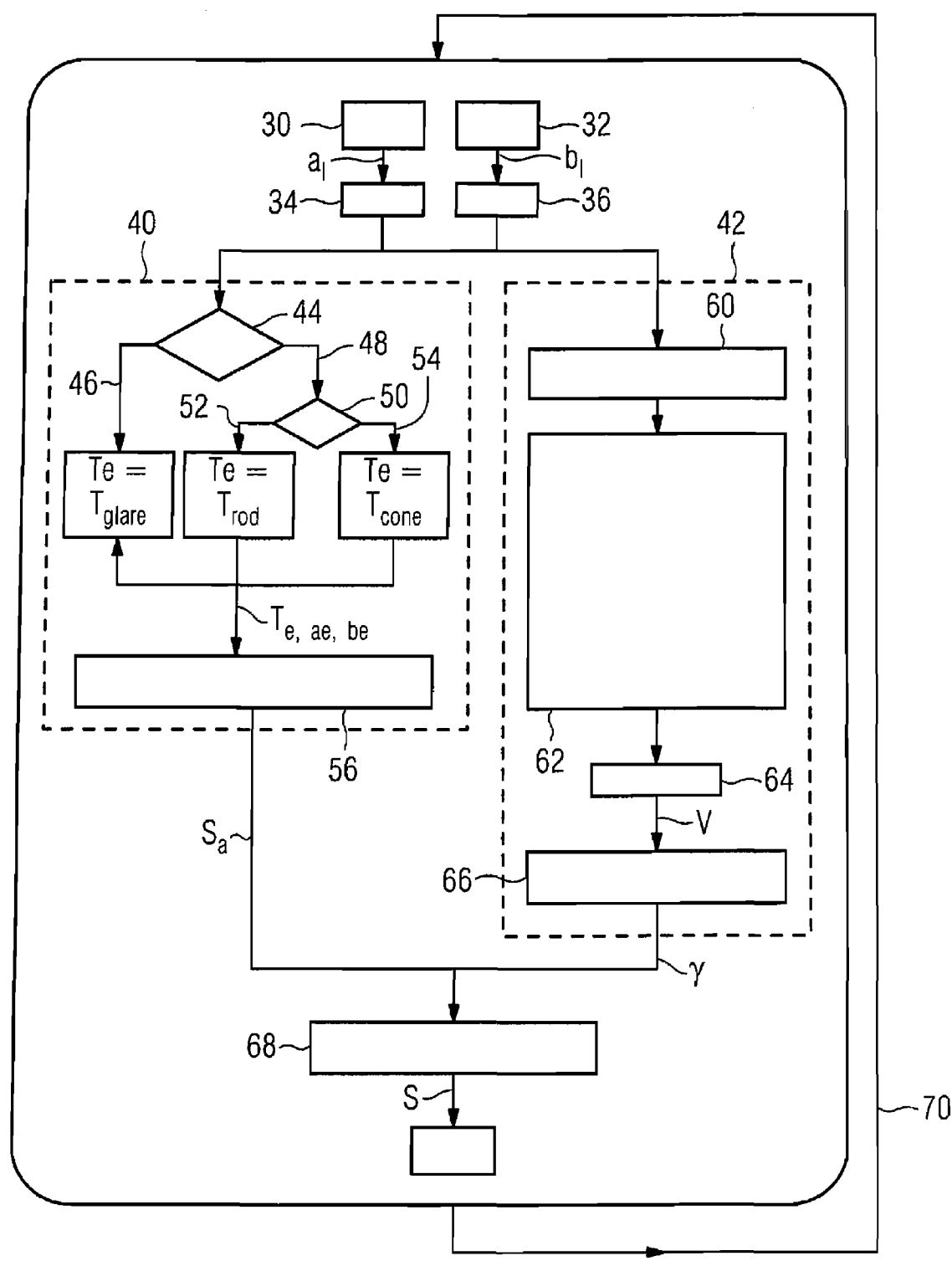
FIG. 2 shows a schematic view of a flow diagram for determining a nominal value.

For adjusting on the rearview mirror 4 a reflectance which is adapted to the situation and to the requirements in the best possible way, the rearview-mirror system 1 additionally comprises a first illuminance sensor 16 arranged on the rearview mirror 4 in forward direction. The illuminance sensor 16 determines a measured value $a_I$, for the luminous intensity of the ambient light or background light, as indicated by the arrow 18. In addition, a second illuminance sensor 20 is provided, which is oriented in backward direction of the motor vehicle and determines a measured value $b_I$ for the luminous intensity of the glaring light caused by the headlights of the following vehicles and other rear light sources. This is indicated by the arrow 22. Through the glaring of the following vehicles, the luminous intensity of the glaring light $b_I·R$ reaches the driver's eye, after reflection on the rearview mirror 4, R being the reflectance of the rearview mirror 4. This is indicated by the arrow 24. The measured values $a_I$, $b_I$ determined by the illuminance sensors 16, 20 are transmitted to the check unit 12, as indicated by the arrows 26, 28, and are taken there as a basis for determining the nominal value S for the reflectance of the rearview mirror 4, the determination of the nominal value S being effected cyclically with a cycle time $\Delta t$ of, for example, 0.2 s. The course of the cyclic new calculation of the nominal value S in the check unit 12 is illustrated schematically in the manner of a flow diagram in FIG. 2.

The measured values $a_I$ for the luminous intensity of the ambient light and $b_I$ for the luminous intensity of the glaring light determined by the illuminance sensors 16, 20 are supplied to corresponding inputs 30, 32 and possibly multiplied, in following modules 34, 36, by correction factors $F_a$, $F_b$, in order to take into consideration specific ambient conditions, the mounting position in the housing or the like.

The measured values $a_I$, $b_I$ corrected in this way are then transmitted on the one hand to an eye module 40 and on the other hand to a traffic-complexity module 42, the eye module 40 determining a first characteristic value $s_a$, which is characteristic of the sensitivity adjusting in the viewer's eye as a consequence of the light situation, whereas the traffic-complexity module 42 determines a second characteristic value $\gamma$, which is characteristic of the kind of ambient light.

When determining the first characteristic value $s_a$ in the eye module 40, it is first of all determined in a comparator stage 44 whether the eye sensitivity adjusting as a consequence of the current light situation exceeds the currently given eye sensitivity represented by the currently given first characteristic value $s_a$. For this purpose, first of all the sum of the first measured value $a_I$, which is characteristic of the luminous intensity of the ambient light, and of the second measured value $b_I$, which is characteristic of the luminous intensity of the glaring light, multiplied by the currently adjusted reflectance R of the rearview mirror is calculated. The result is then multiplied by an eye-sensitivity parameter a, so that the parameter $$a·(a_I+R·b_I)$$

for the current eye sensitivity results. If this value is higher than the currently given first characteristic value $s_a$, a glaring effect will be assumed and a short-term tracking of the first characteristic value $s_a$ will be occasioned. For this purpose, a value $T_{glare}$ of, for example, 1 s, stored for the state of glaring, is assigned in a first branch 46 to a time constant $T_e$, which is characteristic of the eye module 40.

If, however, the above-mentioned value is not higher than the currently given first characteristic value $s_a$, it will be checked in a second branch 48 in a comparator stage 50 whether the currently given first characteristic value $s_a$ is higher or lower than a stored limit value so, representing the limit of the eye sensitivity for "scotopic vision". If the current first characteristic value $s_a$ is lower than the limit value $s_o$, a stored time constant $T_{rod}$, which may have a value of, for example, 100 s and which is characteristic of the reaction time of the eye in scotopic vision, is assigned to the time constant $T_e$ in a first sub-branch 52. In the opposite case, i.e. if the current eye sensitivity $s_a$ is equal to, or higher than, the limit value $s_o$, the state of the eye "photopic vision" is assumed and the value of a stored reaction time $T_{cone}$ of, for example, 5 s, which is characteristic of the reaction time of the eye in photopic vision, is assigned to the time constant $T_e$ in a second sub-branch 54.

The time constant $T_e$ selected according to the above-mentioned pattern, thus taking on one of the values $T_{glare}$, $T_{rod}$ or $T_{cone}$, is then transmitted, together with the measured values $a_l$, $b_l$, to an assignment module 56, in which the first characteristic value $s_a$ is determined anew according to the following equation:

$$s_a = \max\left(s_{amin}, s_a + \frac{\Delta t}{T_e} \cdot (\alpha \cdot (a_l + R \cdot b_l) - s_a)\right)$$

In this way, the currently given first characteristic value $s_a$ is modified in the assignment module 56 by a correction value which, for its part, is a function of the deviation of the sensitivity adjusting in the viewer's eye as a consequence of the current light situation from the currently given first characteristic value $s_a$, the correction value being weighted with the quotient of the cycle time $\Delta t$ and the time constant $T_e$.

This described cyclic updating of the first characteristic value $s_a$ with the time constant $T_e$, which is chosen as a function of the lighting condition of the eye, guarantees in particular that the postcorrection of the first characteristic value $s_a$ is effected in approximation to the reaction speed of the eye, so that a tracking of the first characteristic value $s_a$ particularly adapted to the requirements is achievable, it being in particular taken into consideration that in the state of glaring, the eye reacts relatively quickly, which is taken into account by a relatively short time constant $T_{glare}$. If, on the other hand, only very little light is available (scotopic vision), the eye will adapt itself only slowly to changing light conditions, which is expressed by a relatively long time constant $T_{rod}$. In the twilight, however, the eye reacts more quickly to changing light conditions, which is taken into account by a correspondingly chosen time parameter $T_{cone}$.

In the traffic-complexity module 42, on the other hand, the second characteristic value $\gamma$ is cyclically determined. For this purpose, first of all, based on the currently given measured value $a_l$ for the ambient light and the currently given mean value $a_{lmean}$ for the ambient light, a new, updated mean value is determined in a low-pass module 60, according to the following equation:

$$a_{lmean} = a_{lmean} + \frac{\Delta t}{T_{TCA1}}(a_l - a_{lmean})$$

$T_{TCA1}$ being a time constant for the low pass of the ambient light, which can take on a characteristic value of, for example, 5 s.

Then, a variance parameter $v$ for the luminous intensity of the ambient light is determined in an assignment module 62, characterizing the fluctuations of the luminous intensity of the ambient light around a previously determined mean value. The variance parameter $v$ is newly determined within the cycle, the currently given variance parameter $v$ being modified in the new calculation by a correction value which, for its part, is a function of the deviation of the difference evaluated linearly or quadratically between the current luminous intensity of the ambient light and the mean value of luminous intensity of the ambient light from the currently given variance parameter $v$. The variance parameter $v$ can be assigned a value according to the following equation:

$$v = v + \frac{\Delta t}{T_{TCA2}} \cdot (v_s |a_l - a_{lmean}| - v)$$

$\Delta t$ being the cycle time, $T_{TCA2}$ being a specified time constant for the calculation of the variance of, for example, 10 s, and $v_s$ being a scale factor for the calculation of the variance. To guarantee the desired low-pass function, in particular within the framework of a digital realization of a lowpass, $T_{TCA2}$ is suitably chosen. Alternatively, the updated value for the variance parameter $v$ can also be newly calculated according to the following equations:

$$v = v + \Delta t \cdot \frac{1}{T_{TCA2}} \cdot (v_s(a_l - a_{lmean})^2 - v)$$

or
if $a_l < a_{lmean}$ then $$v = v + \Delta t \cdot \frac{1}{T_{TCA2}} \cdot (-v)$$

else $$v = v + \Delta t \cdot \frac{1}{T_{TCA2}} \cdot (2v_s(a_l - a_{lmean})^2 - v)$$

or
if $a_l < a_{lmean}$ then $$v = v + \Delta t \cdot \frac{1}{T_{TCA2}} \cdot (-v)$$

else $$v = v + \Delta t \cdot \frac{1}{T_{TCA2}} \cdot (2v_s|a_l - a_{lmean}| - v)$$

or
if $a_l < a_{lmean}$ then
$v = v$
else $$v = v + \Delta t \cdot \frac{1}{T_{TCA2}} \cdot (v_s(a_l - a_{lmean})^2 - v)$$

or
if $a_l < a_{lmean}$ then
$v = v$
else $$v = v + \Delta t \cdot \frac{1}{T_{TCA2}} \cdot (v_s|a_l - a_{lmean}| - v)$$

Thus, the new calculation can be effected taking into consideration the linearly evaluated difference between the current luminous intensity of the ambient light and the mean value of the luminous intensity of the ambient light. Alternatively, this difference can preferably also be taken into consideration quadratically, whereby strong fluctuations of the ambient light are taken into account to a greater extent than faint fluctuations. Furthermore, the taking into account of this difference may depend on the direction of deviation from the mean value. In this way, it can be avoided, for example, that in case of a fast and great decrease of the ambient light, for example when entering a dark tunnel, an inappropriately high variance is detected, which in case of suitable glaring light and other conditions might contribute to an undesired brightening of the mirror.

In any case, the determined value for the variance parameter v is limited to a maximum value of 1 for further evaluation. This limitation is effected in a limiter module 64. Then, the cyclically updated variance parameter v determined in this way is transmitted to an assignment module 66.

In the embodiment example, the calculated variance is utilized in the assignment module 66, using a monotonously ascending, preferably asymptotically limited curve, for determining the second characteristic value γ, which is characteristic of the kind of ambient light or of the degree of traffic complexity, the second characteristic value γ being determined in the embodiment example according to the following equation:

$$\gamma = \gamma_{min} + (\gamma_{max} - \gamma_{min}) \cdot \frac{2}{\pi} \arctan \cdot \left(\frac{v}{v_0}\right)$$

$\gamma_{min}$ and $\gamma_{max}$ being specified minimum and maximum values, respectively, and $v_0$ being a suitably chosen reference parameter.

Then, based on the first characteristic value $s_a$ and the second characteristic value γ, the nominal value S is determined in the assignment module 68 according to the following equation:

$$S = \gamma \cdot da \cdot \frac{s_a}{b_l}$$

and limited by a minimum and a maximum value. Then, the nominal value S is output to the control unit 8. Then the nominal value S or the current value for the reflectance R of the rearview mirror 4, respectively, as well as the currently given characteristic values $s_a$, γ, the mean value for the illumination $a_{lmean}$, and the variance parameter v are provided for the next cycle by means of a loop branch 70.

The taking into consideration of the second characteristic value γ guarantees in particular that information on typical light situations can be taken into account to a particularly high extent when activating the rearview mirror 4. Namely, especially when driving in the city, the mirror should rather be brighter, and a slightly increased glaring of the driver can be accepted. On the other hand, in typical light situations when driving on highways or country roads, it is not the information content, but rather the reduction of glaring that shall be optimized, so that in such situations, the mirror shall rather be switched to being darker, the brightening of the mirror after glaring situations being effected with delay. When driving in the city, a brighter mirror will enable, for example, an easier detection of a cyclist in the right outside mirror prior to a turning process. On highways and country roads, however, the optimized reduction of glaring provides for higher comfort and, therefore, for reduced fatigue of the driver.

The above evaluations are preferably carried out through digital processing in a microcomputer.

Additionally, the following table is a list of the parameters used, together with their typical value range and typical average values. The indications are to be understood in the units applicable for the parameter in question, i.e. in particular in s for time constants and in 1x for light constants.

| Designation | Range | Typical value |
| --- | --- | --- |
| $a_l$ | 0.03 ... 30 | |
| $b_l$ | 0.03 ... 30 | |
| $F_{al}$ | 0 ... 5 | 1 |
| $F_{bl}$ | 0 ... 5 | 1 |
| Δt | 0.1 ... 0.5 | 0.2 |
| A | 0 ... 0.1 | 0.02 |
| $s_0$ | 0 ... 0.1 | 0.05 |
| $T_{glare}$ | 0.1 ... 10 | 1 |
| $T_{cone}$ | 1 ... 100 | 5 |
| $T_{rod}$ | 5 ... 400 | 100 |
| $T_e$ | 0.1 ... 400 | |
| $s_{amin}$ | 0 ... 0.2 | 0.025 |
| $s_a$ | 0 ... 10 | |
| $\gamma_{min}$ | 0 ... 1 | 0.07 |
| $\gamma_{max}$ | 0 ... 1 | 0.4 |
| $v_s$ | 0 ... 10 | 1 |
| $T_{TCA1}$ | 1 ... 100 | 5 |
| $T_{TCA2}$ | 1 ... 100 | 10 |
| $v_0$ | 0 ... 1 | 0.3 |
| π | 3.1416 | 3.1416 |
| v | 0 ... 1 | |
| γ | 0 ... 1 | |
| $a_{lmean}$ | 0.03 ... 30 | |
| $R_{min}i$ | 0 ... 1 | 0.1 |
| $R_{max}i$ | 0 ... 1 | 0.7 |
| da | 0 ... 127 | 30 |
| R S | 0 ... 1 | |

What is claimed is:

1. A method for controlling a rearview mirror having a reflection part with a variable reflectance, the method comprising:
    detecting a first measured value that is characteristic of a luminous intensity of ambient light in a viewer's eye;
    detecting a second measured value that is characteristic of luminous intensity of glaring light in the viewer's eye;
    determining a light situation by evaluating a sum of:
        the second measured value multiplied by a current reflectance, and
        the first measured value;
    determining a first characteristic value that is characteristic of an eye sensitivity of the viewer's eye based on the light situation;
    specifying a nominal value for the reflectance based on the first characteristic value; and
    supplying a control unit assigned to the reflection part with the nominal value.

2. The method as recited in claim 1, wherein the rearview mirror is a motor vehicle rearview mirror.

3. The method as recited in claim 1, further comprising:
    cyclically determining anew a further first characteristic value by modifying the first characteristic value using a correction value, wherein the correction value is determined as a function of a deviation of the sensitivity of the viewer's eye as a consequence of the current light situation from the given first characteristic value;
    and specifying anew the nominal value using the further first characteristic value.

4. The method as recited in claim 3, further comprising weighting the correction value using a quotient of a cycle time and a time constant.

5. The method as recited in claim 4, further comprising choosing the time constant as a function of the sensitivity of the viewer's eye as a consequence of the current light situation.

6. The method as recited in claim 5, further comprising, assigning a first value to the time constant if a glare of the eye is detected;

assigning a second value to the time constant if a mesopic vision state is detected; and assigning a third value to the time constant if a state scotopic vision is detected.

7. The method as recited in claim 6, wherein the first value is smaller than the second value and the second value is smaller than the third value.

8. The method as recited in claim 3, wherein the cyclically determining anew of the first characteristic value is performed according to the following equation:

$$s_a = \max\left(s_{amin}, s_a + \frac{\Delta t}{T_e} \cdot (\alpha \cdot (a_l + R \cdot b_l) - s_a)\right)$$

wherein:
$s_a$ is the first characteristic value,
$s_{amin}$ is a specified minimum value for the first characteristic value,
$\Delta t$ is the cycle time,
$T_e$ is the time constant,
a is the eye sensitivity parameter,
$a_l$ is the luminous intensity of the ambient light,
R is the reflectance,
$b_l$ is the luminous intensity of the glaring light.

9. The method as recited in claim 1, further comprising:
determining a second characteristic value using a variance parameter characterizing fluctuations around a predetermined mean value for a luminous intensity of the ambient light, wherein the specifying the nominal value is performed based on the first characteristic value and the second characteristic value.

10. The method as recited in claim 9, further comprising cyclically determining anew a further variance parameter by modifying the first variance parameter by a variance correction value, the variance correction value being a function of a deviation of a difference between the luminous intensity of the ambient light and a mean value of the luminous intensity of the ambient light from the variance parameter.

11. The method as recited in claim 10, wherein the cyclically determining anew of the further variance parameter is performed according to at least one of the following equations:

$$v = v + \frac{\Delta t}{T_{TCA2}} \cdot (v_s|a_l - a_{lmean}| - v)$$

and $$v = v + \Delta t \cdot \frac{1}{T_{TCA2}} \cdot (v_s(a_l - a_{lmean})^2 - v)$$

and
if $a_l < a_{lmean}$ then
$v = v$
else $$v = v + \Delta t \cdot \frac{1}{T_{TCA2}} \cdot (-v)$$

else $$v = v + \Delta t \cdot \frac{1}{T_{TCA2}} \cdot (2v_s(a_l - a_{lmean})^2 - v)$$

and
if $a_l < a_{lmean}$ then $$v = v + \Delta t \cdot \frac{1}{T_{TCA2}} \cdot (-v)$$

else $$v = v + \Delta t \cdot \frac{1}{T_{TCA2}} \cdot (2v_s|a_l - a_{lmean}| - v)$$

and
if $a_l < a_{lmean}$ then
$v = v$
else $$v = v + \Delta t \cdot \frac{1}{T_{TCA2}} \cdot (v_s(a_l - a_{lmean})^2 - v)$$

and
if $a_l < a_{lmean}$ then
$v = v$
else $$v = v + \Delta t \cdot \frac{1}{T_{TCA2}} \cdot (v_s|a_l - a_{lmean}| - v)$$

wherein:
v is the variance parameter,
$a_l$ is the luminous intensity of the ambient light
$a_{lmean}$ is the mean value of the luminous intensity of the ambient light,
$\Delta t$ is the cycle time,
$T_{TCA2}$ is a suitably chosen time constant for guaranteeing a low-pass function, and
$v_s$ is a scale factor.

12. The method as recited in claim 9, further comprising specifying a minimum and a maximum value for the second characteristic value.

13. The method as recited in claim 9, further comprising determining the second characteristic value using a monotonously ascending curve.

14. The method as recited in claim 13, wherein the curve is asymptotically limited.

15. The method as recited in claim 9, further comprising specifying a minimum and a maximum value for the nominal value.

16. The method as recited in claim 1, wherein the specifying of the nominal value is performed based on the first characteristic value and a second characteristic value that is characteristic of a kind of ambient light based on traffic complexity.

17. A method for controlling a rearview mirror having a reflection part with a variable reflectance, the method comprising:
determining a second characteristic value that is characteristic of a kind of ambient light based on traffic complexity using a variance parameter characterizing fluctuations around a pre-determined mean value for a luminous intensity of the ambient light and using a monotonously ascending curve according to the following equation:

$$\gamma = \gamma_{min} + (\gamma_{max} - \gamma_{min}) \cdot \frac{2}{\pi} \arctan \cdot \left(\frac{v}{v_0}\right)$$

wherein:
$\gamma$ is the second characteristic value, $\gamma_{min}$ and $\gamma_{max}$ are specified minimum and respectively maximum values, v is a variance parameter, and $v_0$ is a suitably chosen reference value;

specifying a nominal value for the reflectance based on the second characteristic value;

supplying a control unit assigned to the reflection part with the nominal value for the reflectance.

18. A method for controlling a rearview mirror having a reflection part with a variable reflectance, the method comprising:

detecting a first measured value that is characteristic of a luminous intensity of ambient light in a viewer's eye;

detecting a second measured value that is characteristic of luminous intensity of glaring light in the viewer's eye;

determining a first characteristic value that is characteristic of an eye sensitivity of the viewer's eye and being determined using the first and second measured values;

specifying a predetermined mean value for a luminous intensity of the ambient light;

determining a variance parameter based on an amount of deviation of the luminous intensity of the ambient light around the predetermined mean value;

determining a second characteristic value that is characteristic of a kind of ambient light based on traffic complexity using the variance parameter; and specifying a nominal value for the reflectance based on the first characteristic value and the second characteristic value; and supplying a control unit assigned to the reflection part with the nominal value for the reflectance.

19. The method as recited in claim 18, further comprising cyclically determining anew a further variance parameter by modifying the first variance parameter by a variance correction value, the variance correction value being a function of a deviation of a difference between the luminous intensity of the ambient light and a mean value of the luminous intensity of the ambient light from the variance parameter.

20. The method as recited in claim 19, wherein the cyclically determining anew of the further variance parameter is performed according to at least one of the following equations:

$$v = v + \frac{\Delta t}{T_{TCA2}} \cdot (v_s|a_l - a_{lmean}| - v)$$

and $$v = v + \Delta t \cdot \frac{1}{T_{TCA2}} \cdot (v_s(a_l - a_{lmean})^2 - v)$$

and if $a_l < a_{lmean}$ then $$v = v + \Delta t \cdot \frac{1}{T_{TCA2}} \cdot (-v)$$

else $$v = v + \Delta t \cdot \frac{1}{T_{TCA2}} \cdot (2v_s(a_l - a_{lmean})^2 - v)$$

and if $a_l < a_{lmean}$ then $$v = v + \Delta t \cdot \frac{1}{T_{TCA2}} \cdot (-v)$$

else $$v = v + \Delta t \cdot \frac{1}{T_{TCA2}} \cdot (2v_s|a_l - a_{lmean}| - v)$$

and if $a_l < a_{lmean}$ then
$v = v$
else $$v = v + \Delta t \cdot \frac{1}{T_{TCA2}} \cdot (v_s(a_l - a_{lmean})^2 - v)$$

and if $a_l < a_{lmean}$ then
$v = v$
else $$v = v + \Delta t \cdot \frac{1}{T_{TCA2}} \cdot (v_s|a_l - a_{lmean}| - v)$$

wherein:

v is the variance parameter, $a_l$ is the luminous intensity of the ambient light $a_{lmean}$ is the mean value of the luminous intensity of the ambient light, $\Delta t$ is the cycle time, $T_{TCA2}$ is a suitably chosen time constant for guaranteeing a low-pass function, and $v_s$ is a scale factor.

21. The method as recited in claim 18, further comprising specifying a minimum and a maximum value for the second characteristic value.

22. The method as recited in claim 18, further comprising determining the second characteristic value using a monotonously ascending curve.

23. The method as recited in claim 22, wherein the curve is asymptotically limited.

24. The method as recited in claim 18, further comprising specifying a minimum and a maximum value for the nominal value.

* * * * *